US006913267B2

(12) United States Patent
Price et al.

(10) Patent No.: US 6,913,267 B2
(45) Date of Patent: Jul. 5, 2005

(54) APPARATUS FOR ALIGNING PUSH RODS

(75) Inventors: Bradley Price, Joliet, IL (US); James Strepek, Lombard, IL (US); John A. Serio, Lake in the Hills, IL (US); Gary S. Svidron, Lemont, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 10/677,455

(22) Filed: Oct. 2, 2003

(65) Prior Publication Data

US 2005/0073112 A1 Apr. 7, 2005

(51) Int. Cl.[7] .................................................. F16J 15/14

(52) U.S. Cl. ........................ 277/590; 277/277; 277/592; 277/597

(58) Field of Search .................................. 277/591–598

(56) References Cited

U.S. PATENT DOCUMENTS 4,535,999 A * 8/1985 Locacius .................... 277/596
6,237,557 B1 * 5/2001 Wiegert ................... 123/193.5

* cited by examiner

*Primary Examiner*—Enoch Peavey
(74) *Attorney, Agent, or Firm*—Susan L. Lukasik; Dennis Kelly Sullivan; Jeffrey P. Calfa

(57) ABSTRACT

A cylinder head gasket (211) includes one or more alignment holes (301) and one or more drain-back holes (303) disposed in an area of the cylinder head gasket (211). One or more push rods (211) are extendable through the alignment holes (301). The one or more drain-back holes (303) are formed such that the one or more push rods (211) are incapable of fitting through the one or more drain-back holes (303).

20 Claims, 3 Drawing Sheets

FIG. 4
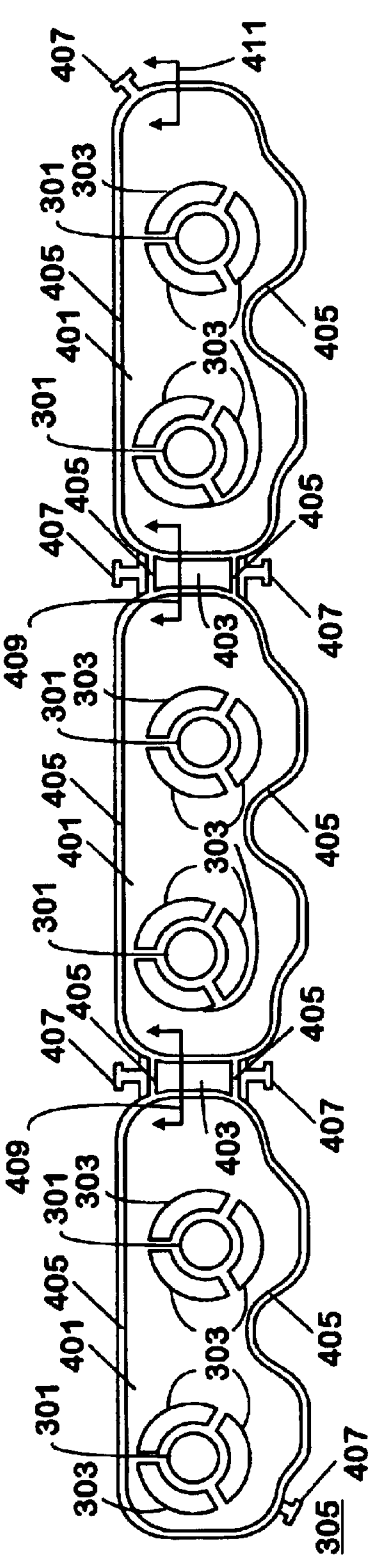
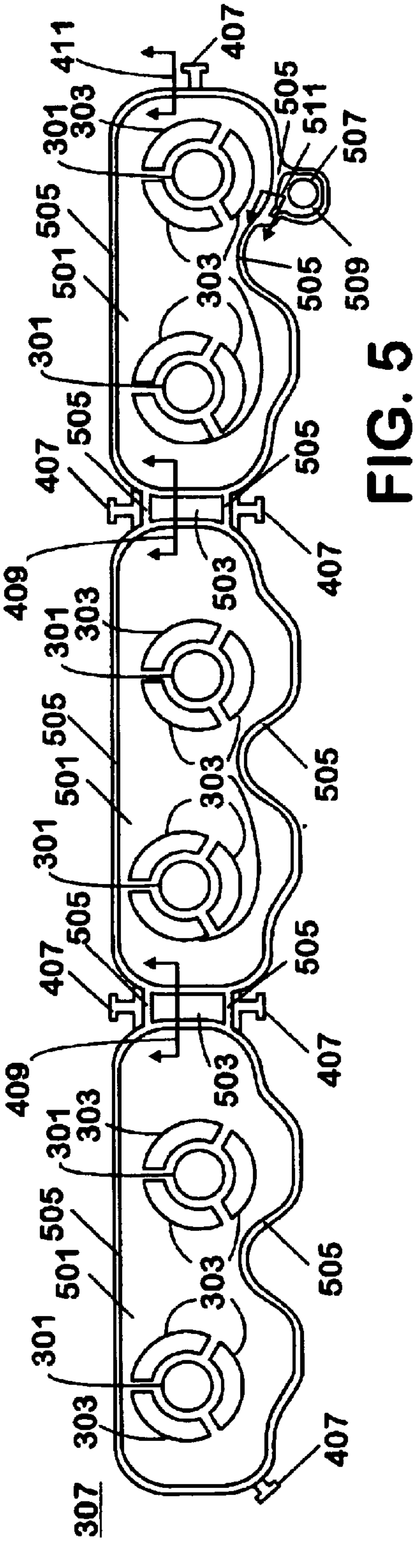
FIG. 5

APPARATUS FOR ALIGNING PUSH RODS

FIELD OF THE INVENTION

This invention relates to push rod alignment, including but not limited to the use of a cylinder head gasket to align push rods.

BACKGROUND OF THE INVENTION

Cylinder head gaskets are typically disposed between a cylinder block, also known as an engine block, and a cylinder head of an internal combustion engine. Various fluids, such as oil, coolant, and/or fuel, may pass between the cylinder block and cylinder head. Cylinder head gaskets are known to provide a seal between the various parts of the cylinder head and cylinder block such that the various fluids do not mix.

In some internal combustion engines, push rods pass through the cylinder block and the cylinder head. The push rods also pass through the cylinder head gasket. A cylinder head gasket 100, such as shown in FIG. 1, includes a plurality of alignment holes 101 through which the push rods extend. A plurality of oil drain-back holes 103 allow oil to pass between the cylinder head and the cylinder block. Because of the close proximity of the alignment holes 101 to the oil drain-back holes 103, and because the oil drain-back holes 103 are larger than the alignment holes 101, it is possible to improperly install the push rods in the oil drain-back holes 103, resulting in misaligned push rods. Misaligned push rods in an engine may result in damage to the push rods, the cylinder head gasket 100, the cylinder head, and so forth. Such an engine is not likely to operate properly, and results in the need for an expensive repair.

Accordingly, there is a need for a reliable method of installing push rods in an engine, which method reduces the occurrence of misaligned push rods.

SUMMARY OF THE INVENTION

A cylinder head gasket comprises one or more alignment holes and one or more drain-back holes disposed in an area of the cylinder head gasket. One or more push rods are extendable through the alignment holes. The one or more drain-back holes are formed such that the one or more push rods are incapable of fitting through the one or more drain-back holes.

BRIEF DESCRIPTION OF THE DRAWINGS

FIG. 4 and FIG. 5 show a top view of inserts for a cylinder head gasket in accordance with the invention.

DESCRIPTION OF A PREFERRED EMBODIMENT

The following describes an apparatus for and method of aligning push rods within a cylinder block with the use of a cylinder head gasket having a plurality of alignment holes. The drain back holes are formed such that the push rods cannot fit through them. The alignment holes may be advantageously formed such that the push rods fit through in only the correct orientation.

Figure 2:
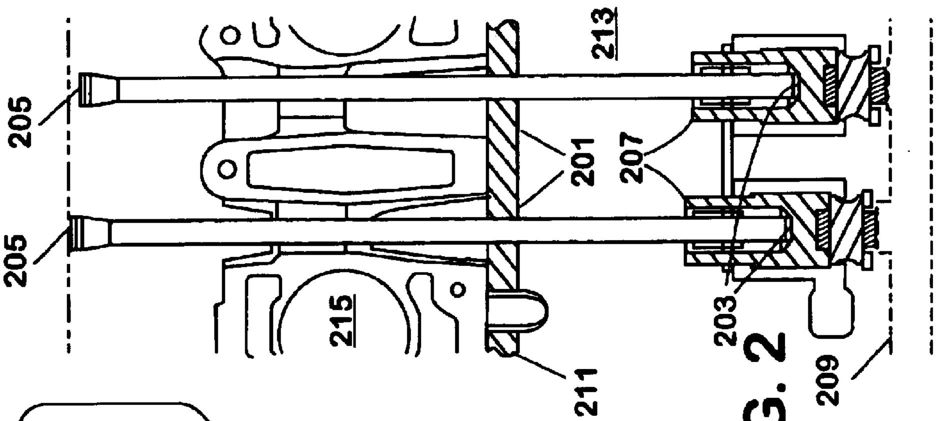
FIG. 2 is a cross-section of an engine showing a plurality of push rods extending through a cylinder head, a cylinder head gasket, and a cylinder block in accordance with the invention.
Figure 1:
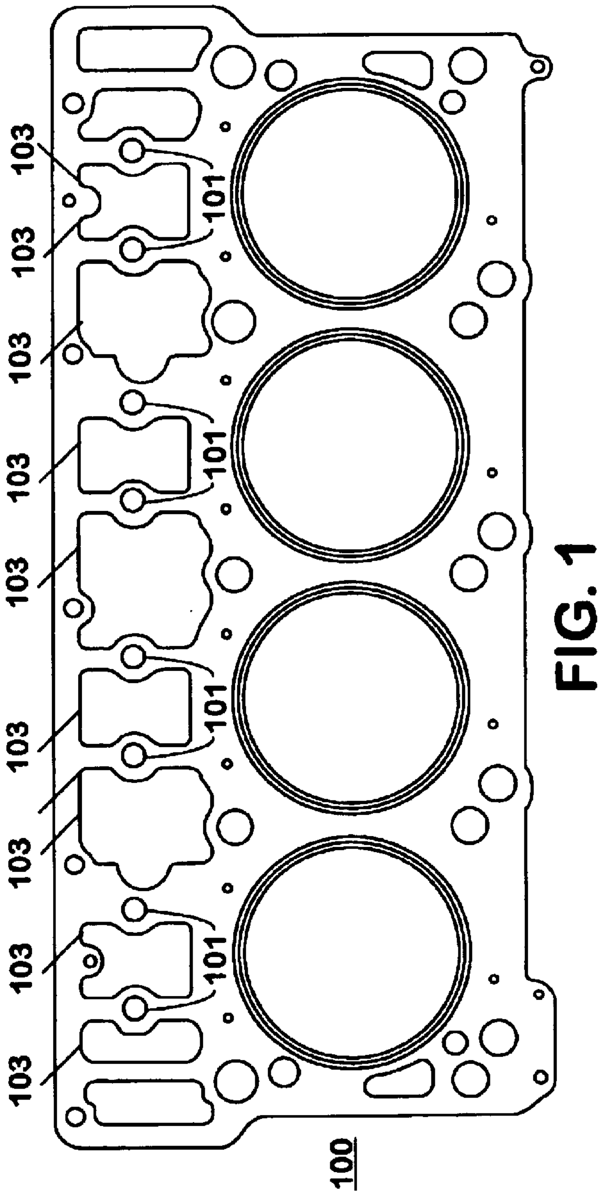
FIG. 1 PRIOR ART
FIG. 1 is a top view of a cylinder head gasket having alignment holes for push rods.

A cross-section of an engine showing a plurality of push rods extending through a cylinder head, a cylinder head gasket, and a cylinder block is shown in FIG. 2. A plurality of push rods 201 have a first end 203 that is smaller than a second end 205. The smaller ends 203 of the push rods 201 fit inside valve lifters or roller tappets 207 that are actuated by a cam shaft 209. The push rods 201 extend from the valve lifters 207 through alignment holes 301 (see FIG. 3) in the cylinder head gasket 211 that is disposed between the cylinder block 213 and the cylinder head 215. The larger ends 205 of the push rod actuate rocker arms (not shown) that operate the valves (not shown) of the engine. Proper alignment of the push rods 201 within the cylinder block 213 for the engine shown in FIG. 2 aligns the push rods 201 directly between the rocker arms and the valve lifters 207.

Figure 3:
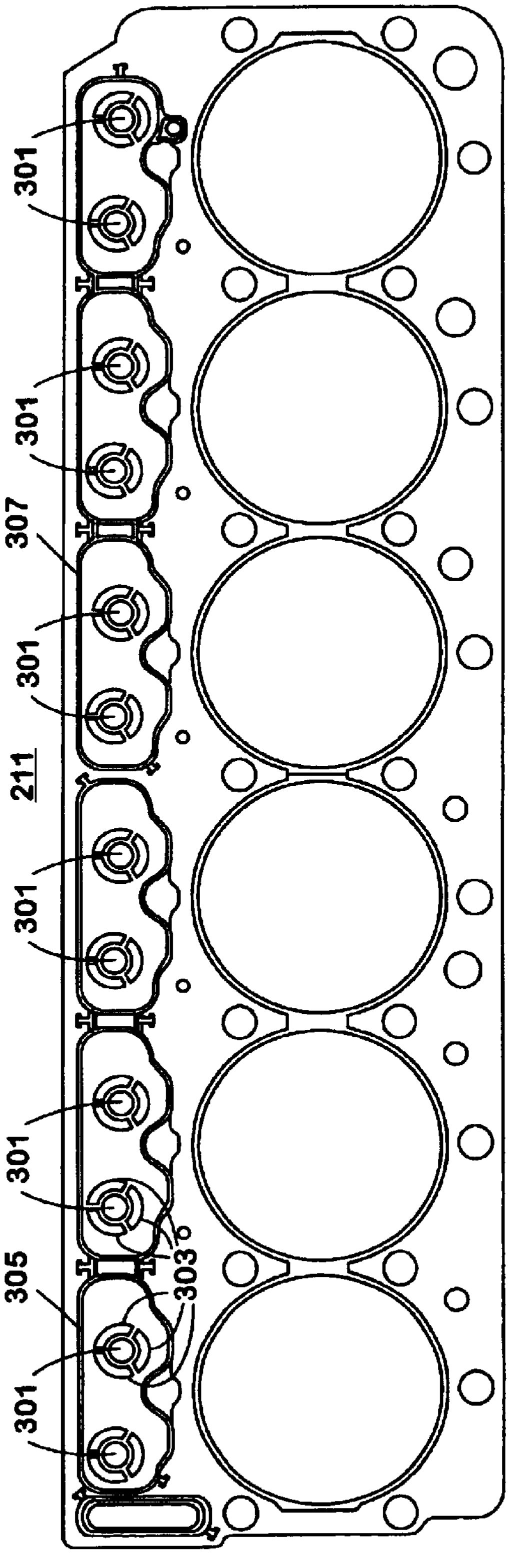
FIG. 3 is a top view of a cylinder head gasket having alignment holes for push rods in accordance with the invention.

A top view of a cylinder head gasket having alignment holes for push rods is shown in FIG. 3. An alignment hole 301 is disposed in the cylinder head gasket 211 for each of the push rods 201 in the engine. Each alignment hole 301 is advantageously located in an area of the cylinder head gasket 211 such that when the smaller end of the push rod 201 is dropped through the alignment hole 301, the push rod 201 slides into its respective valve lifter 207 when the cylinder head gasket 211 and/or cylinder head 215 are disposed on the cylinder block 213. The alignment holes 301 may advantageously be formed to provide a close fit to an outer diameter of the push rods 201 such that when the push rods 201 slide through the alignment holes 301, the push rods 201 are capable of only sliding into their respective valve lifters 207. The close fit may be obtained, for example, by providing the same shape as the outer diameter of the push rods 201 and utilizing a size slightly greater than that outer diameter. The alignment holes 301 may advantageously be formed such that only the smaller end 203, but not the larger end 205, of the push rods 201 fits through the alignment holes 301. A plurality of drain-back holes 303 are disposed around each of the alignment holes 301.

A top view of inserts 305 and 307 for a cylinder head gasket are shown in FIG. 4 and FIG. 5. Each insert 305 or 307 is comprised of a structure 401 or 501, respectively, that has an optional seal 405 or 505, respectively, disposed at or along the outer perimeter or edge of the structure 401 or 501. The structure 401 or 501 may be, for example, a relatively flat steel member, in which the alignment holes 301 and drain-back holes 303 are formed. The holes 301 and 303 may be formed in ways known in the art, such as stamping, blanking, laser-cutting, and so forth. The inserts 305 and 307 are shown formed in a plurality of sections, although they need not be formed in such a way. Optional bridges 403 and 503 are formed between the sections of the structures 401 and 501 for support, to reduce the complexity of the number of inserts, and to facilitate placement of seal material to reduce potential leak paths.

The alignment holes 301 may be advantageously formed such that the smaller end 203 of the push rods 201 is capable of fitting through the alignment holes 301, but the larger end 205 of the push rods 201 is not capable of fitting through the alignment holes 301. Such formation may be provided, for example, by selecting the size and shape of the alignment holes 301 appropriately. For example, the alignment holes 301 may be match the shape of the outer perimeter of the push rod 201 and have an opening that is larger in diameter than the main shaft of the push rod 201, but smaller than the larger end 205 of the push rod 201. The alignment holes 301 may be advantageously formed such that they are capable of providing a close fit to the outer diameter of the push rods 201, thereby leaving very little possibility that a push rod 201 could be dropped through an alignment hole 301 and into anything but the appropriate valve lifter 207 when the cylinder head gasket 211 and/or cylinder head 215 are assembled with the cylinder block 213.

The drain-back holes 303 are shown disposed near the alignment holes 301. Although the drain-back holes 303 are shown comprising of a plurality of partial rings disposed near each of the alignment holes 301, other shapes, sizes, and locations of drain-back holes 303 may also be successful. The drain-back holes 303 are advantageously formed such that neither end 203 or 205 of the push rods 201 fits through the drain-back holes 303. The drain-back holes 303 have openings that provide sufficient area through which a desired amount of oil is capable of passing at any particular time. As long as the push rods 201 are capable of fitting only through the alignment holes 301 and fitting through no other holes in the area of the alignment holes 301, such as drain back holes, mounting holes, and so forth, the push rods 201 will be properly aligned within the cylinder block 213, and as appropriate, with respect to the rocker arms and valve lifters 207.

Figure 8:
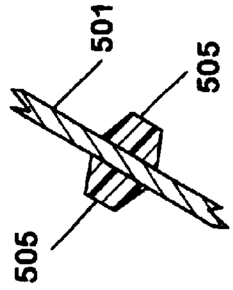
FIG. 8 is a cross-sectional view through line 511 in accordance with the invention.
Figure 7:
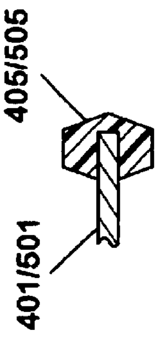
FIG. 7 is a cross-sectional view through any of lines 411 in accordance with the invention.
Figure 6:
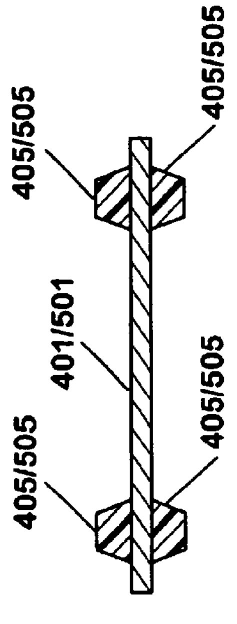
FIG. 6 is a cross-sectional view through any of lines 409 in accordance with the invention.

A seal 405 or 505 is disposed or formed at or along the outer perimeter or edge of the structure 401 or 501. The seal 405 or 505 may be, for example, a molded rubber bead that is formed along the outer perimeter of the structure 401 or 501 and extends away form the structure 401 or 501 in both directions, as shown in the cross-sectional views shown in FIG. 6, FIG. 7, and FIG. 8. The seal 405 or 505 advantageously surrounds the entire outer edge of the structure 401 or 501, as shown in FIG. 7. Additional sealing material may be advantageously added to areas other than the outer perimeter or edge of each structure 401 or 501, such as to surround the bridges 403 and 503 between the various sections of the inserts 305 and 307 in order to eliminate leakage paths for fluids. Sealing material may also be advantageously added to separate the hole 507 in the tab 509 from the rest of the insert 307, which hole 507 facilitates transfer of oil at higher pressures than the oil traversing the drain-back holes 303. The seals 405 and 505 generally keep oil from leaking past the seal 405 or 505 into other areas of the cylinder head gasket 211 and prevent other fluids, such as coolant or fuel from leaking from the body of the gasket past the seal 405 or 505 into the oil. The seals 405 and 505 may alternatively be located closer to the drain holes 303 than shown in the figures.

The inserts 305 and 307 are attached to the body of the cylinder head gasket 211 with a plurality of tabs 407 by pushing the tabs 407 into and bending them around the body material, for example, in the way staples are utilized. The body of the cylinder head gasket 211 may comprised of multiple layers of materials, for example, a steel center, surrounded on each side by perforated steel core, with an outer layer of graphite on the outer surface of both perforated steel cores. Another example may be a perforated steel core surrounded by graphite on all surfaces. The tabs 407 may push through one or more layers, including all the layers, of the gasket 211. Alternatively, the inserts 305 and 307 may be welded, glued, or affixed in other manners that successfully provide the desired functionality.

The embodiment shown in FIG. 3, FIG. 4, and FIG. 5 illustrates alignment holes 301 and drain-back holes 303 formed within inserts 305 and 307 that are attached to the body of the cylinder head gasket 211. The alignment holes 301 and drain-back holes 303 may be formed directly in the body of the cylinder head gasket 211, rather than formed on inserts. The optional seals 405 and 505 are disposed around the alignment holes 301 and drain-back holes 303 to provide the desired sealing function.

The present invention may be utilized in various types of engines, such as inline engines, L-type engines, V-type engines, gasoline or diesel engines, and so forth.

The present invention provides a method and apparatus for correctly orienting and aligning push rods within a cylinder block and cylinder head, and as appropriate, with respect to the rocker arms and valve lifters, during the assembly process through the use of alignment holes in a cylinder head gasket. Because the push rods are not capable of fitting through any other holes, such as oil drain-back holes, in the area surrounding the alignment holes, correct alignment of the push rods has a very high likelihood of success. Correct orientation of push rods is facilitated by appropriate forming of alignment holes. The present invention reduces assembly time, complexity, errors, and the need for repair or rework.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A cylinder head gasket comprising:

one or more alignment holes disposed in an area of the cylinder head gasket, wherein one or more push rods are extendable through the alignment holes;

one or more drain-back holes disposed in the area of the cylinder head gasket, wherein the one or more drain-back holes are formed such that the one or more push rods are incapable of fitting through the one or more drain-back holes.

2. The cylinder head gasket of claim 1, wherein the area of the cylinder head gasket is part of an insert that is attached to a body of the cylinder head gasket.

3. The cylinder head gasket of claim 2, further comprising one or more tab arranged and constructed to attach the insert to the body of the cylinder head gasket.

4. The cylinder head gasket of claim 2, wherein the insert is comprised of steel.

5. The cylinder head gasket of claim 2, further comprising a seal.

6. The cylinder head gasket of claim 2, further comprising a seal disposed outside at least one of the one or more drain-back holes.

7. The cylinder head gasket of claim 5, wherein the seal is comprised of a molded rubber bead.

8. The cylinder head gasket of claim 1, further comprising a seal disposed in the area of the cylinder head gasket.

9. The cylinder head gasket of claim 1, wherein the one or more alignment holes are formed such that a smaller end of one of the one or more push rods is capable of fitting through the one or more alignment holes and a larger end of the one of the one or more push rods is not capable of fitting through the one or more alignment holes.

10. The cylinder head gasket of claim 1, wherein the one or more push rods are capable of fitting only through any of the one or more alignment holes in the area of the cylinder head gasket.

11. The cylinder head gasket of claim 1, wherein the one or more drain-back holes are disposed near the one or more alignment holes.

12. The cylinder head gasket of claim 1, wherein the one or more drain-back holes are comprised of a plurality of partial rings disposed near each of the one or more alignment holes.

13. The cylinder head gasket of claim 1, wherein the one or more alignment holes are capable of providing a close fit to an outer diameter of the one or more push rods.

14. An apparatus comprising:

one or more alignment holes formed in a structure for use with a cylinder head gasket, wherein one or more push rods are extendable through the alignment holes;

one or more drain-back holes disposed in the structure, wherein the one or more drain-back holes are formed such that the one or more push rods are incapable of fitting through the one or more drain-back holes.

15. A cylinder head gasket comprising at least two alignment holes disposed in an area of the cylinder gasket and capable of aligning at least two push rods with respect to a cylinder block of an internal combustion engine, and one or more drain-back holes disposed in the structure and incapable of permitting any of the at least two push rods to fit through the one or more drain-back holes.

16. The cylinder head gasket of claim 14, further comprising a seal disposed outside at least one of the one or more drain-back holes.

17. The cylinder head gasket of claim 16, wherein the seal is comprised of a molded rubber bead.

18. The cylinder head gasket of claim 14, wherein the one or more alignment holes are formed such that a smaller end of one of the one or more push rods is capable of fitting through the one or more alignment holes and a larger end of the one of the one or more push rods is not capable of fitting through the one or more alignment holes.

19. The cylinder head gasket of claim 14, wherein the one or more push rods are capable of fitting only through any of the one or more alignment holes in the structure.

20. The cylinder head gasket of claim 14, wherein the one or more drain-back holes are comprised of a plurality of partial rings disposed near each of the one or more alignment holes.

* * * * *